United States Patent [19]
Tartabini et al.

[11] 3,794,340
[45] Feb. 26, 1974

[54] ADJUSTABLE SKID FOR PIPE INSPECTION OR SURVEY EQUIPMENT

[75] Inventors: Joseph J. Tartabini, Independence; Frank L. Sirk, South Euclid, both of Ohio

[73] Assignee: United Survey, Inc., Cleveland, Ohio

[22] Filed: July 13, 1972

[21] Appl. No.: 271,566

[52] U.S. Cl. .................. 280/15, 104/138, 280/20
[51] Int. Cl. .................................... B62b 13/16
[58] Field of Search .. 280/12 R, 12 M, 12 W, 8, 15, 280/18, 19, 20; 104/138, 139; 15/104.3 R

[56] References Cited
UNITED STATES PATENTS

| | | | |
|---|---|---|---|
| 2,299,993 | 10/1942 | Kirk | 280/20 |
| 1,498,446 | 6/1924 | Geskey | 15/104.3 R |
| 2,725,239 | 11/1955 | Murray | 280/18 |
| 2,612,380 | 9/1952 | Cawl | 280/12 W |
| 2,394,264 | 2/1946 | Robinson | 280/12 R |

Primary Examiner—Robert R. Song
Attorney, Agent, or Firm—Philip D. Golrick et al.

[57] ABSTRACT

A basic clamping cradle for an elongated tubularly cased TV or photo strip camera, used in pipe survey, is supported on a pair of laterally spaced ski-like elongated bottom runners each connected to a respective longitudinal frame element at front and back ends through a pivotally extensible linkage having variable points of shiftable attachment, whereby the runner spacing may be adjusted to support a camera substantially at the axis of pipes of different sizes within its range.

9 Claims, 4 Drawing Figures

PATENTED FEB 26 1974 3,794,340
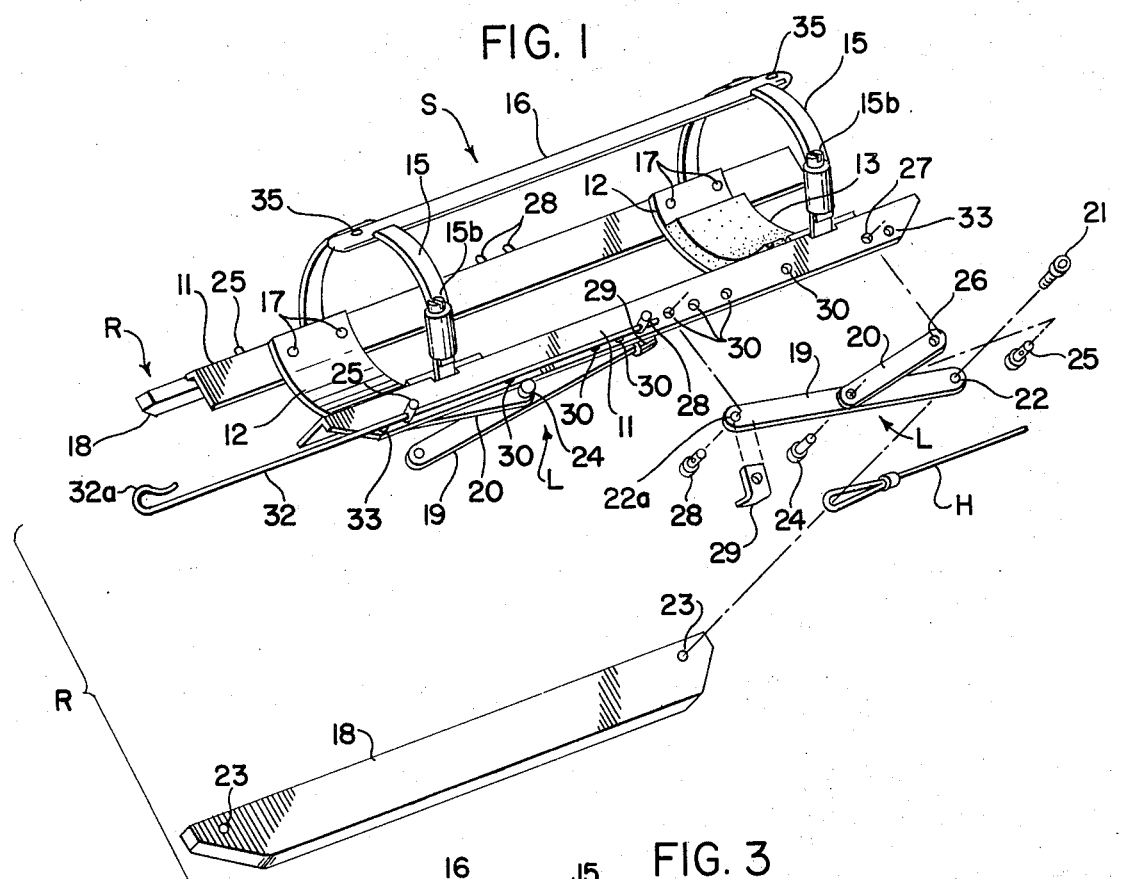
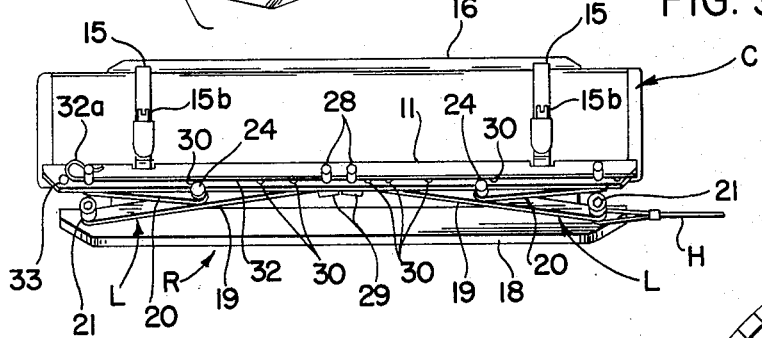
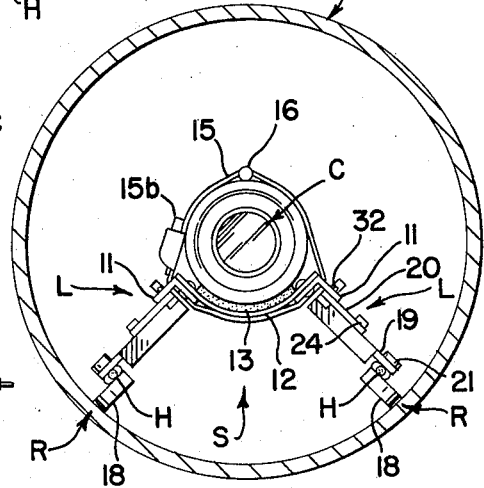

ADJUSTABLE SKID FOR PIPE INSPECTION OR SURVEY EQUIPMENT

For interior survey inspection of various conduits such as pipe lines, especially sewer lines or other underground conduits, photo-strip or TV cameras on a skid with appropriate lighting equipment are drawn by cable between two open locations in the line to determine the conduit condition, points of breakage or of leakage and the like, either with instantaneous perception or observation, as for example at the console of a closed circuit television system, or by subsequent inspection of a film strip produced by triggering the camera at regular intervals so that each frame corresponds to a known position along the survey path. Television cameras are thus used especially for controlling operations of repair tools towed at a fixed distance from the camera lens so that the repair equipment can be actuated to carry out a repair operation at the required point as observed by the camera system.

Because of a considerable size range of conduits or pipes which may be encountered, the camera support sled or skid is desirably adapted in its support on the pipe wall to locate the camera axis substantially at the axis of the pipe for the more effective use and operation of the camera on each job.

Hence, by the prior art, at least as represented by devices in common practice and public use such adaptation has been made, for example, by providing a series of changeable runner pairs, each pair having a respectively different length in fixed supporting struts bolted on the basic skid cradle to accommodate to a particular four-bar spacer set out of a series of spacer bars sets of different lengths for bolted attachment of the same pair of runners. Such expedients for obtaining adjustability have obviously required not only a relatively large number of elements for the equipment set, representing additional cost for material and fabrication, opportunity for loss of components, but as well have entailed an undesirable loss of time and labor in adapting the device to each size pipe encountered. Diamond jack type or other complex linkages have avoided the multiplicity of separate parts, but with an attendant expense.

By the present invention of which one specific embodiment is hereinafter described, a quite simple basic cradle structure is provided including a like pair of bottom longitudinal frame members with respect to which corresponding runners are mounted by simple pivotally extensible lever linkages having adjustable points of pinning connections, permitting an expeditious release, repositioning and securement of the linkages with a minimum of labor and inconvenience, whereby the device is quickly and readily adjustable for disposition of the axis of the contained camera substantially at the axis of the pipe.

It is the general object of the present invention to provide an improved skid for support, in a tubular conduit, of a TV camera, photo camera and the like, affording a novel type of adjustable structure quickly changeable to adapt from one pipe size to another.

A further object is the provision of an adjustable skid of the type described including fewer and less costly elements for the range of adjustability attained.

A still further object is the provision of a new adjustable skid of the type described whereby there is less opportunity or occasion for loss of parts in the overall service and use of equipment.

Other objects and advantages of the invention will appear from the following description and drawings wherein:

FIG. 1 is a generally perspective view of a camera support skid device embodying the invention with the support of one runner partially disassembled and in exploded view;

FIG. 2 is a schematic or generalized view into a pipe showing desired support of a camera with axis disposed coaxial with the pipe;

FIGS. 3 and 4 respectively are side views of the skid with a camera supported therein, with the runners adjusted for accommodation in a minimum and a large pipe size within the designed range of the device.

One embodiment of the invention is shown in the drawings, with FIGS. 1 representing the structure of the skid S itself which enables a desired support of the camera C or the like with axis centered on the axis of a pipe P as indicated in the FIG. 2, through which the camera with ancillary gear, such as lighting equipment, is to be drawn by appropriately rigged cables, usually a leading pull cable with a trailing cable for emergency or other retraction use as may be needed. The centering or adaptation to different conduit sizes is obtained by changed settings of spaced pipe-engaging support or runner structures R from the minimum pipe size disposition of FIG. 3 outwardly as shown in FIG. 4 for larger sizes.

The support structure for longitudinal stability must each afford bearing on the pipe at least at two regions respectively spaced from mid-length of the carriage or skid toward its ends. At least two such support structure are required for use in a conduit which is not vertical; but where the camera carriage is used in a bore or conduit which is or markedly approaches vertical then at least three adjustable supports structures are needed.

The skid or carriage includes a somewhat cradle-like basic frame to embrace say of about a third of the circumference of the camera casing for which it is intended, comprising a pair of rigid parallel longitudinal frame members 11—11, here shown as right angle sections, near opposite ends joined to each other by curved downwardly convex plates 12, 12, each of which may bear a cemented-on cushion or pad 13; thus providing a supporting seat or cradle for a tubularly cased camera as at C in FIGS. 2–4 held therein by front and back clamping strap devices 15, 15, between the top arches of which is supported a bar or top runner 16.

The ends of plates 12, curved appropriately to the curvature of the intended camera casing for which the skid is designed, taking into account padding to be used or not, may each have, as indicated at 17, a simple rivetted securement to the respective inner legs or sides of frame members 11 which respectively support a camera casing longitudinally. The clamping straps generally indicated 15 may be simple circular bands passed under respective plate 12 and threaded through slots in the longitudinal elements, with an appropriate clamping bolt connection as at 15b between the strap ends;or obviously a shorted strap may have one end rivetted on or otherwise secured to one longitudinal member and the other end secured to the oppoiste longitudinal member by the clamping bolt means.

The cradle frame here has two support structures R, comprising selectively adjustably spaceable longitudinal support members 18; each of which,preferably to having spaced wheels, takes the form of a simple curved-ended bar or runner supported at its opposite ends on the corresponding frame member 11 by like pivotally extensible linkage assemblies L.

Each linkage assembly L comprises a strut bar 19 with ends pivotally secured to the respective member 11 and to the runner bar or support member 18, a brace bar 20 pivotally secured between the mid-region of 19 and the member 11; and releasable securing means for the connections on member 11. The screw 21 through the strut aperture 22 into the runner tapped hole 23, in addition to securing strut 19 to R may, if desired, secure one end of a tow cable bridle H with bight 25 disposed between link 19 and runner R.

The brace strut element 20 preferably has an end permanently but pivotally rivetted at 24 to strut 19 and its other end releasably secured to the frame element 11 by a flat head rivet-like pivot pin 25 passed through its end aperture 26, and through a corresponding aperture 27 of the member 11, the pin 25 preferably apertured for a cotter-like releasable locking means to be described.

The other end of the link or strut 19 is similarly secured by a headed pivot pin 28 therethrough passed through a retainer clip 29, and finally through the longitudinal frame member 11 at a selected one of the respective series of size adjustment holes 30; a common lock rod or stiff wire 32 extending through the apertures of the pins 25 and 28 for both linkages of each runner. The lock rod may be hook-formed at the one end 32a to afford a snap-over retentive engagement at one end with a pin 25 and also facilitate handling.

The top bar 16, where as here shown not an adjustable runner, may comprise a simple tubular element inwardly diametrically slotted to receive the respective straps 15 retained simply by rivetting the bifurcations resulting as at 35 or by a screw and bolt passed therethrough.

The clips 29 are merely perforated, bendable strap metal elements, which, once the pins 28 are passed through the strut and clip apertures, are then simply bent down around the strut element 20 and under the head of pins 28 to keep the latter then captive on the respective struts; with the thickness of the clips corresponding to that of braces 20 whereby the clips also serve as appropriate spacers. The clips also secure against loss of the pins 28 from struts 20 when the rod 32 is pulled for release and size change positioning of thelinkage.

As should be obvious from the geometry of holes for each linkage the successive holes may be appropriately diversely spaced on the member 11, so that changing of the pins 28 (which are to be engaged at respectively corresponding holes in the two series) between successive holes, moves the runner by appropriate distance relative to the axis of the cradle to correspond to successive standard size pipe increments of diameter; it being an obviously useful expedient to mark corresponding holes of each series with the appropriate pipe size number.

The additional hole 33 may serve as another point for placement of the brace pivot pin 25, when for example two of the holes for a pin 28 in the adjacent series 30 would be placed too close together, were the same location for the pin 25 maintained. Also a further series of increments or adjusted sizes not corresponding to standard pipe sizes is available by use of the alternate locations of pins 25.

Where the carriage is primarily to be used for work in standard size pipes, the above described securement especially of the struts by pivot pins in distinct holes each corresponding to a particular pipe size is preferable to the alternative of a pivot bolt slideable along a longitudinal slot in the frame member 11. Also the location of the changeable pivotal connections in the frame members 11, remote from the pipe wall, is preferable to the alternative location in the runner or support members 18, where those changeable connections and any locking means would be more exposed to fouling, abrasion or other deleterious influences, especially by sediments, debris and the like in the bottom region of a more or less horizontal pipe run.

From the above description and drawings it should be apparent that the adjustment for pipe sizes is expeditiously made at each support structure R simply by withdrawing the rod 32, relocating the pins 28 and as needed pins 25 of each linkage at the appropriate pipe size hole location, and then re-threading the rod 32 back through the apertures of the pins of the group, thus again locking in place all connections for a runner.

Clearly such operation is readily carried out with not tools required as compared with the aforedescribed prior adjustable skids which entailed unscrewing and retightening operations of four or eight bolted points. The saving in time, labor and actual material used in the skids is apparent.

With such adjustability the desired coaxial disposition of the camera in the pipe as indicated at FIG. 2 is readily attained for the purposes of pipe inspection or for control and observation for example of repair operations carried out by a tool trailing the camera.

With the support members 18 made of heavy bar stock the center of gravity for the carriage or skid, even with load, is kept correspondingly low, contributing to stability in traversing a pipe.

Obviously the invention has applicability for transport of other than tubular shaped loads, such as a rectangularly cased camera, by corresponding change in the cradle frame configuration.

Similarly the location in the pipe cross section of a load other than a camera may be appropriately adjusted, or example, laser pipe aligning equipment, or a motor driven rotary root cutter where respectively the optical axis and rotary axis is to be located at the pipe axis, or a hydraulic pipe cleaner self-propelled by the reaction of cleaning water jets. At times the adjustability may usefully locate the skid transported device or load in the pipe section with a disposition other than coaxial.

What is claimed is:

1. For transport through a generally round section conduit, of a camera or other device to be supported in selected disposition in the conduit, a carriage comprising:

a cradle frame adapted to receive and secure thereon a said device, said frame including two frame members having respective elongated portions extending parallel to each other and longitudinally of the frame;

a respective elongated support member paired with, secured to and extending generally parallel to each said frame member, each said support member including means affording carriage supporting bearing on the conduit interior surface at least at two points near respective opposite ends of said cradle frame;

linkage means for securing each support member in selectively spaced relation to its paired respective frame member, whereby said cradle frame, and thereby a said device therein, may be supported in a predetermined relation to the conduit axis;

said linkage means including for each support member two like linkage assemblies, associated with respective ends of the said members of each pair, each said assembly comprising a strut element with one end pivotally connected to a selectable point on the one of the respective paired members and other end pivotally connected to a point near the respective end of the other paired member, a brace element having one end pivotally connected to the strut element intermediate of its ends and the other brace element end pivotally connected to the said one of the paired members at a point spaced from the selectable connection point of the strut member outwardly toward the member end.

2. A carriage as described in claim 1, wherein each said support member has the form of an elongated runner having a long conduit contacting sliding edge as the said means affording supporting bearing.

3. A carriage as described in claim 1, wherein each said one of the paired members is a said frame member, and each said frame member has an array of longitudinally spaced pivot pin receiving apertures affording selectable points for attachment of the respective strut members, each strut member having a pivot pin projecting therefrom for pivotal connection of the strut end to the corresponding said frame member at a selected aperture.

4. A carriage as described in claim 3, wherein said pivot pins each have a safetying hole through the end thereof;

and further including a locking rod associated with each frame member extending through the safetying holes of corresponding said pivot pins.

5. A carriage as described in claim 4, wherein each said brace element is secured to the respective frame member by a pivot pin extending therefrom and having a safetying hole therethrough;

each said locking rod extending through the several pivot pins through the respective frame element.

6. A carriage as described in claim 3 wherein each said pivot pin passes through a retaining clip strip having one end interposed between the respective strut and frame member and bent around the strut element over a head of the pin to hold it captive.

7. A carriage as described in claim 3, wherein said cradle frame comprises;

a parallel pair of elongated right angle sections as said frame members;

a pair of similar downwardly curved plates secured between the frame members near respective opposite ends thereof, each said plate comprising less than a semi-circle in its curved extent and having its ends secured on respective inner legs of the angle sections, and the other legs of the angle sections extending outwardly, generally radially to the plate curves, and being parallel with said series of apertures.

8. A carriage as described in claim 7, wherein said cradle frame further includes clamping means associated with and continuing from each curved plate in a circularly embracng enclosure above the respective plate for clamping a tubular casing of a said device therein.

9. A carriage as described in claim 8, wherein said clamping means each is a circular clamping strap;

and including further a top bar extending longitudinally between and having opposite ends secured to the respective said clamping straps.

* * * * *